United States Patent [19]

Tanaka et al.

[11] Patent Number: 4,979,109

[45] Date of Patent: Dec. 18, 1990

[54] METHOD OF CONTROLLING A DATA DICTIONARY DIRECTORY SYSTEM IN A DATA BASE SYSTEM

[75] Inventors: Kazuaki Tanaka, Sagamihara; Ichiro Yokoyama, Ebina; Satoshi Wakayama, Kawasaki; Yoshito Kamegi, Yokohama; Makoto Urakawa, Yokohama; Mikihiko Tokunaga, Yokohama; Takeshi Kamoshida, Yokohama; Shigeru Yoneda, Ebina; Kiyotaka Kiyasu, Yokohama, all of Japan

[73] Assignee: Hitachi Ltd.

[21] Appl. No.: 3,255

[22] Filed: Jan. 14, 1987

[30] Foreign Application Priority Data

Jan. 27, 1986 [JP] Japan .................................. 61-13805

[51] Int. Cl.$^5$ ..................... G06F 15/40; G06F 7/00; G06F 9/38
[52] U.S. Cl. .................................. 364/200; 364/900
[58] Field of Search ........................... 364/200, 300

[56] References Cited

U.S. PATENT DOCUMENTS

| 4,221,003 | 9/1980 | Chang et al. | 364/900 |
| 4,476,528 | 10/1984 | Matsumoto et al. | 364/300 |
| 4,531,186 | 7/1985 | Knapman | 364/300 |
| 4,627,019 | 12/1986 | Ng | 364/900 |
| 4,631,664 | 12/1986 | Bachman | 364/300 |
| 4,644,471 | 2/1987 | Kojima et al. | 364/300 |
| 4,648,036 | 3/1987 | Gallant | 364/300 |
| 4,769,772 | 9/1988 | Dwyer | 364/200 |
| 4,774,661 | 9/1988 | Kumpati | 364/900 |
| 4,805,099 | 2/1989 | Huber | 364/200 |
| 4,819,160 | 4/1989 | Tanka et al. | 364/200 |
| 4,833,597 | 5/1989 | Wakayama et al. | 364/200 |

FOREIGN PATENT DOCUMENTS

| 61-196335 | 8/1986 | Japan . | |
| 61-290532 | 12/1986 | Japan | 364/200 |
| 62-173545 | 7/1987 | Japan . | |
| 62-173546 | 7/1987 | Japan . | |

OTHER PUBLICATIONS

Allen et al., "The Integrated Dictionary/Directory System", Jun. 1982, Computing Surveys, vol. 14, No. 2, published by ACM.

Primary Examiner—Andrew J. James
Assistant Examiner—Viet Q. Nguyen

[57] ABSTRACT

In a data dictionary directory system, the definition information to be registered in a dictionary is registered being divided into several definition units. A data base system registers the definition information and confirms the coordination of the contents of definition among the definition units. The definition information is registered without confirming the coordination. The coordination is confirmed when it becomes necessary to confirm the coordination among the definition informations registered in the dictionary.

13 Claims, 12 Drawing Sheets

METHOD OF CONTROLLING A DATA DICTIONARY DIRECTORY SYSTEM IN A DATA BASE SYSTEM

BACKGROUND OF THE INVENTION

1. Field of the Invention

The present invention relates to a data dictionary directory system having a function to register and control definition information that specifies the structure of data base of a data base system and to convert it into an execution time format.

2. Description of the Prior Art

When a definition information is to be registered being divided into several definition units in a data dictionary directory system, it is accepted practice to confirm whether there is non-coordination in the definition content among the definition units.

The dictionary directory has been described in the Computing Surveys, "The Integrated Dictionary/Directory System", Vol. 14, No. 2, published by ACM, June, 1982.

In the dictionary have been stored definition information called logic schema which specifies the structure of the whole data base and definition information called sub-schema which specifies the structure of the data base of a range in which a user program can be used for each of the user programs, the definition information being stored in a source form that is adapted to registering and controlling the definition information.

The directory is converted into the form of a table so that definition information stored in the dictionary can be easily utilized for executing the access processing into the data base.

The registration unit (definition unit) of definition information onto the dictionary is set in a variety of sizes depending upon the characteristics of the structure of data base that is to be defined so that it can be suitably utilized by a user, and the generation unit of the directory table is set by taking into consideration the execution time performance such as data base control program and the independence among the definition units used for generating tables. Usually, the definition unit is different from the generation unit of table.

The definition information registered into the dictionary is used not only for generating a directory but also for a variety of uses such as for confirming that the data base system access instruction in the user program is not contradictory to the definition content of the data base system when the user program is being compiled.

In order to confirm the coordination of definition content among the definition units, the definition information related to the dictionary and the directory must have been stored.

In the conventional system in which the above-mentioned confirmation is carried out when the definition information is to be registered, it is essential that the related definition information is all prepared at the time of registration. Therefore, sequence (e.g., definition information of lower bits is registered after related definition information of upper bits is registered) is required for registering the definition unit, with no flexibility in the work of registration and control.

SUMMARY OF THE INVENTION

The object of the present invention therefore is to provide a method of controlling a dictionary directory, which requires no sequence in registering the definition information and which has no non-coordination among the definition information.

According to the present invention, related definitions are not checked when the definition information is to be registered into the dictionary, provision is made of means for registration into the dictionary and another means for confirming the coordination among the related definitions, the coordination is checked as required, and no sequence is specified among the definition units that are to be registered into the dictionary, in order to improve operability of registration into the dictionary and control thereof.

Owing to the function for checking the coordination of definition unit of definition information in the dictionary, the coordination can be confirmed among the definition information that serve as prerequisites only with regard to necessary definition information registered in the dictionary out of synchronism with the registration just before the definition information of the dictionary is required, for the purpose of generating directory and proving the user program.

DESCRIPTION OF THE PREFERRED EMBODIMENTS

An embodiment of the present invention will now be described in conjunction with FIGS. 1 to 14.

Figure 1:
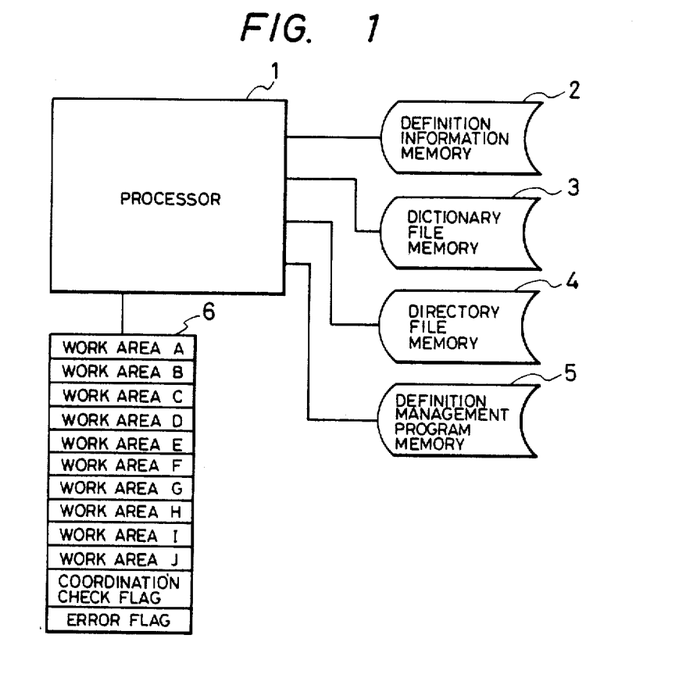
FIG. 1 is a diagram illustrating the structure of a hardware according to an embodiment of the present invention.

FIG. 1 shows the structure of a hardware which realizes a system for controlling the data base of the present invention, wherein reference numeral 1 denotes a processor that retrieves necessary information, 2 denotes a definition information memory for storing definition information which specifies the structure of data base, 3 denotes a dictionary file memory for storing the dictionary, 4 denotes a directory file memory for storing the directory, 5 denotes a definition management program memory for storing the program that controls the coordination check, and reference numeral 6 denotes a work area for storing the retrieved information. The work area 6 has storing areas A to J, and further has a coordination check flag which indicates whether the coordination is checked or not, and an error flag which indicates that a pertinent information does not exist as a result of retrieval.

In this system, the dictionary in the dictionary file memory 3 determines the structure of the whole data base, and the directory in the directory file memory 4 is the one which is converted from the dictionary and which has the structure that can be easily utilized by a user.

In the following description, the definition specification of data base is based upon the ISO X3H2-84-48 Draft Proposed "Network Database Language" (hereinafter referred to as NDL).

According to the NDL, the logical structure of data base is defined by a record type which illustrates the structure of record, a component type which defines the structure of field that constitutes the record, and a set type which shows a relationship among the records. In the following description, a logical schema refers to logical structure of a data base that is defined by the record type, component type and set type. A portion of the logical schema that is re-defined is referred to as sub-schema.

The sub-schema is defined by a set view for the record of logic schema, for a record view component and for a component view set.

The user of data base can use the data base within a range of this sub-schema.

Figure 2:
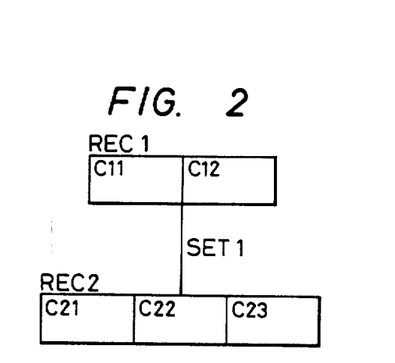
FIG. 2 is a diagram which illustrates the logical structure of a data base.

An example of defining the logic schema is described below. The logical structure of data base is as shown in FIG. 2, wherein the record names are REC1, REC2, and the component names constituting the records are, respectively, C11, C12 and C21, C22, C23. The set name of records REC1 and REC2 is SET1.

Figure 3:
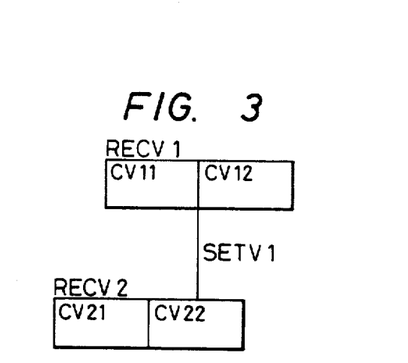
FIG. 3 is a diagram exemplifying a sub-schema in the data base of FIG. 2.
Figure 4:
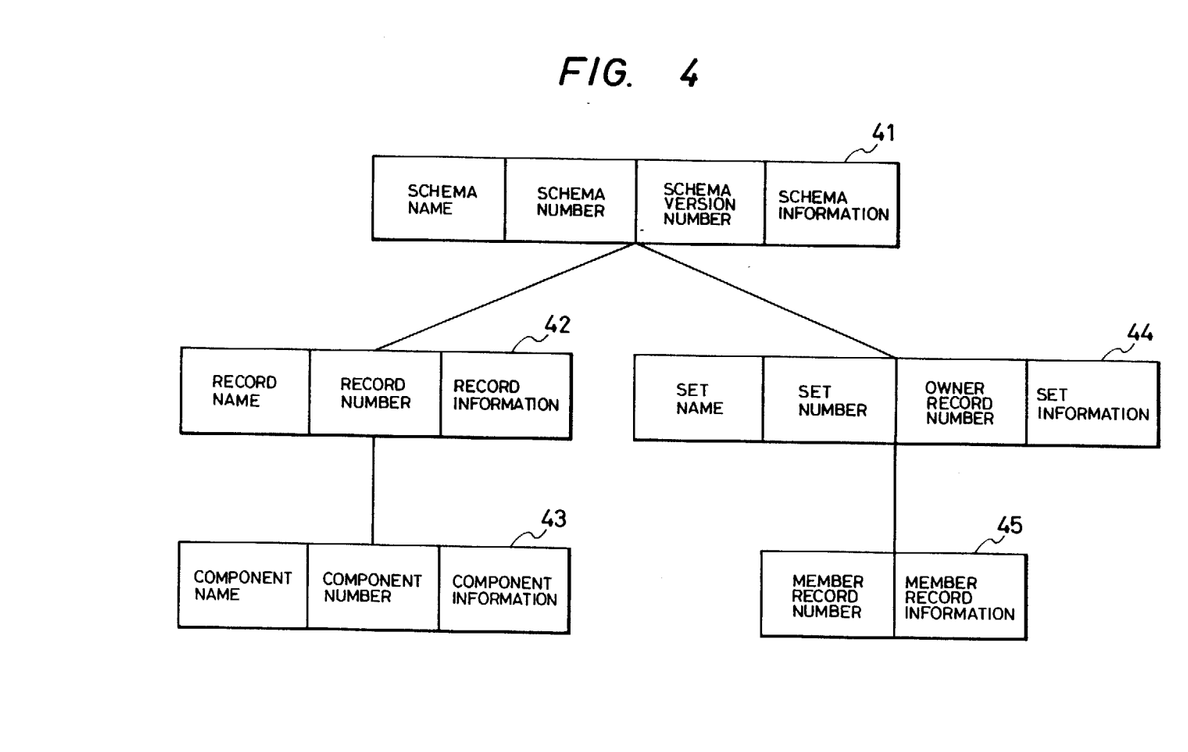
FIG. 4 is a diagram illustrating the structure of the definition data of when the definition information of schema is to be controlled by a dictionary.

FIG. 3 shows the structure of a sub-schema, wherein the record view names are RECV1, RECV2, and the component view names constituting the record views are, respectively, CV11, CV12 and CV21, CV22. The set view name of record views RECV1 and RECV2 is SETV1. The logic schema and sub-schema registered into the dictionary are individually provided with names and version numbers. FIG. 4 illustrates the structure of the dictionary which registers definition information of the logic schema.

In FIG. 4, a schema name, an exclusive schema number in the system, a schema version number and schema information related to the whole logic schema are registered in a schema record 41; a record name, an exclusive record number in the schema, and record information of a record unit are registered in a record type record 42; a component name, an exclusive component number in the record, and component information of a component unit are registered in a component type record 43; a set name, an exclusive set number in the schema, a record number of an owner record that serves as a parent of the set, and set information of a set unit are registered in a set type record 44; and a record number of a member record that serves as a child of the set, and member record information of a member record unit are registered in a set member record 45.

Set relations exist between the schema record 41 and the record type record 42, between the record type record 42 and the component record 43, between the schema record 41 and the set type record 44, and between the set type record 44 and the set member record 45.

Figure 5:
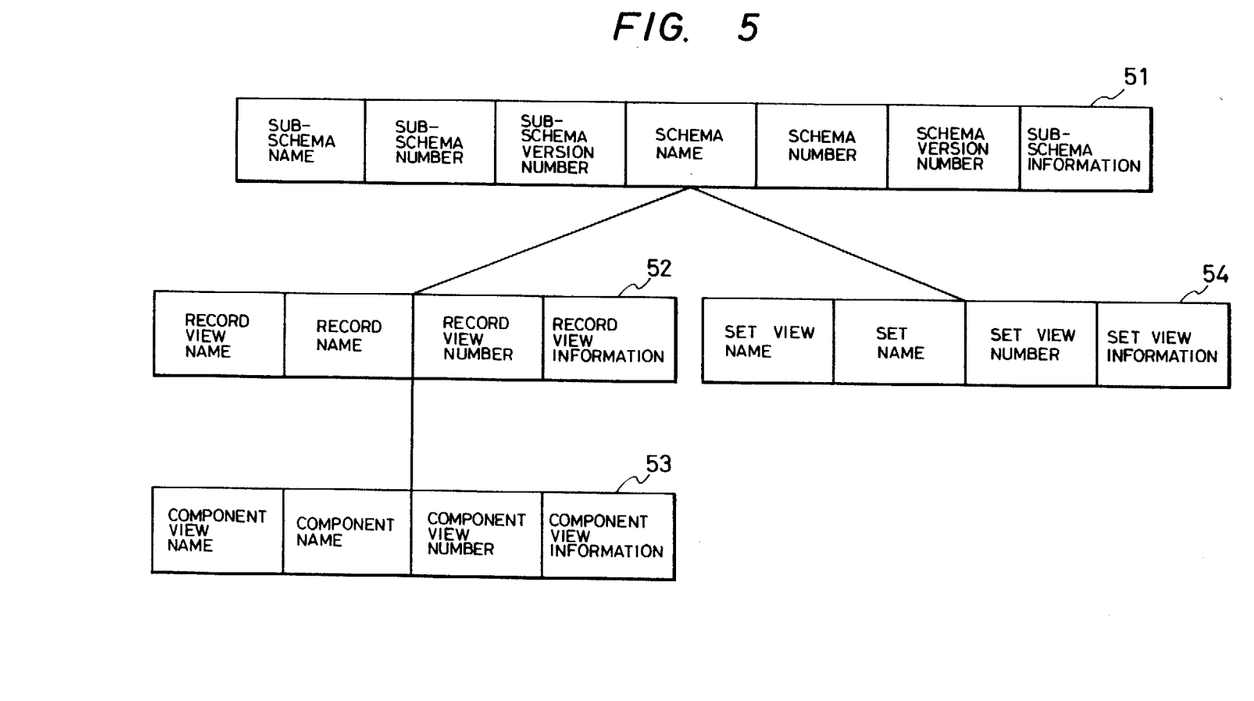
FIG. 5 is a diagram illustrating the structure of the definition data of when the sub-schema definition information is to be controlled by a dictionary.

FIG. 5 illustrates the structure of the dictionary for registering the definition information of sub-schema.

In FIG. 5, a sub-schema name, an exclusive sub-schema number in the schema, a sub-schema version number, a schema name, a schema number, a schema version number and sub-schema information related to the whole sub-schema are registered into a sub-schema record 51; a record view name, an exclusive record view number in the sub-schema, a record name of a record corresponding to the record view and record view information of a record view unit are registered in a record view record 52; a component view name, an exclusive component view number in the record view, a component name corresponding to the component view, and component view information of a component view unit are registered into a component view record 53; and a set view name, an exclusive set view number in the sub-schema, a set name of a set corresponding to the set view, and set view information of a set view unit are registered into a set view record 54. Set relations exist between the sub-schema record 51 and the record view record 52, between the record view record 52 and the component view record 53, and between the sub-schema record 51 and the set view record 54.

Figure 6:
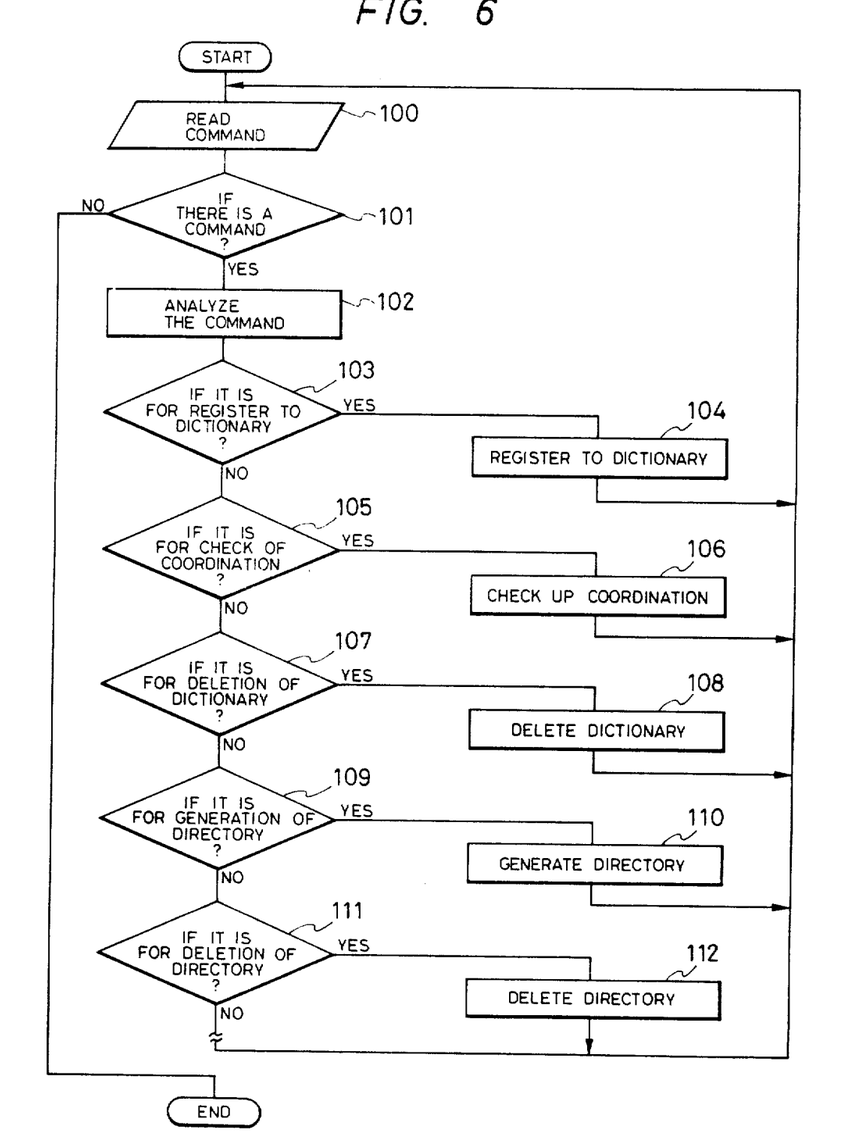
FIG. 6 is a diagram which schematically illustrates the whole processing of definition management program according to an embodiment of the present invention.

The processing contents of definition management program based upon the commands will now be described with reference to a flow chart of FIG. 6. Definitions of the data base system are registered being divided into several definition units depending upon the semantic classifications of definition terms (such as definition of data base, definition of communications circuit system, definition of system execution environment system, definition of transactions, and like definitions or depending upon the structure of stratum (such as relations of a schema that defines the logical structure of a data base and a sub-schema that defines an imaginary visual field such as usable range or the name during the use (a range that can be used by a user program)).

As the definition management program is started, definition information is read from the definition information memory 2 for each command unit, and is stored in the storing area A of the work 6 of FIG. 1 (100). If no management command is input (101), the processing is completed. The command that is input is analyzed (102). If it is a command (103) that instructs the dictionary registration, the process for registration into the dictionary is effected (104), and the program returns to the start point. In the same way, if it is a management command that instructs to check the definition information in the dictionary (105), the coordination check processing is effected (106). If it is a management command (107) that instructs to delete the dictionary (107), the dictionary deletion processing is executed (108). If it is a management command which instructs to generate the directory (109), the directory generation processing is executed (110). If it is a management command which instructs to delete the directory (111), the directory deletion processing is executed (112).

Here, the description does not refer to the processing for compiling the program. At the time of compiling, another means is employed to examine a range which requires the coordination of definition information, i.e., to examine whether it is a processing related to a plurality of registration units, and to determine that the coordination of the definition information has not yet been confirmed. When these conditions are established, the coordination check processing is effected relying also upon a routine of coordination check processing 106.

Figure 7:
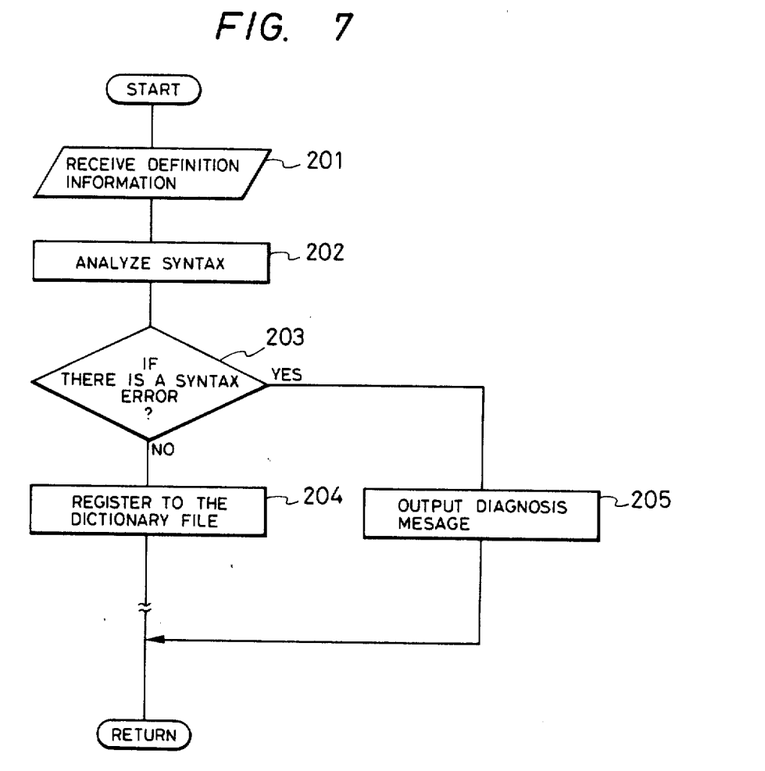
FIG. 7 is a diagram which exemplifies the dictionary registration processing of FIG. 6.

The dictionary registration processing 104 will now be described briefly with reference to FIG. 7.

As the dictionary registration processing routine is started, definition information to be registered into the dictionary is read out from the definition information memory 2, and is stored in the storing area B of the work area 6 of FIG. 1 (201). The definition information that is input is analyzed (202). If there is any syntax error (203), the diagnosis message is produced to complete the processing (205).

The definition information which is gramatically correct is registered, in the case of schema definition, into the dictionary file memory which has data structure as shown in FIG. 4 (204).

If the sub-schema is to be registered in this embodiment, however, the schema number and the schema version number are blank in the definition information of FIG. 5. This is because, the sub-schema definition information is registered independently of the definition information of the schema, and these numbers remain unobvious. These two columns are filled when the coordination relative to the schema is checked. Whether the coordination is checked or not is indicated by whether these two columns are blank or not.

Figure 8:
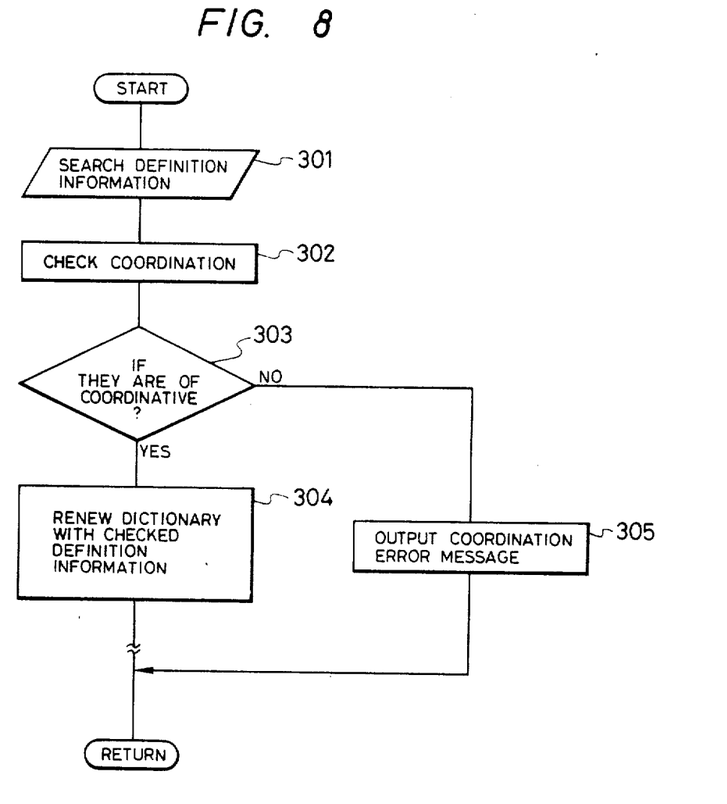
FIG. 8 is a diagram which exemplifies the coordination check processing of FIG. 6.

Outline of the coordination check processing will now be described in conjunction with a flow chart of FIG. 8.

As the coordination check processing routine is started, definition information specified by a kind of dictionary definition unit instructed by a management command of which the coordination is to be checked and specified by the name of definition information, as well as related definition information, are retrieved from the dictionary and are stored in the work areas C, D (301). The coordination is checked (302) among the retrieved definition informations. If there is not coordination, a message of coordination error is produced (305) to complete the processing. If there exists the coordination, the information (such as the aforementioned schema number and the schema version number) obtained by checking the coordination are added to the definition information that is to be referred to, thereby to renew the dictionary (304).

Figure 9:
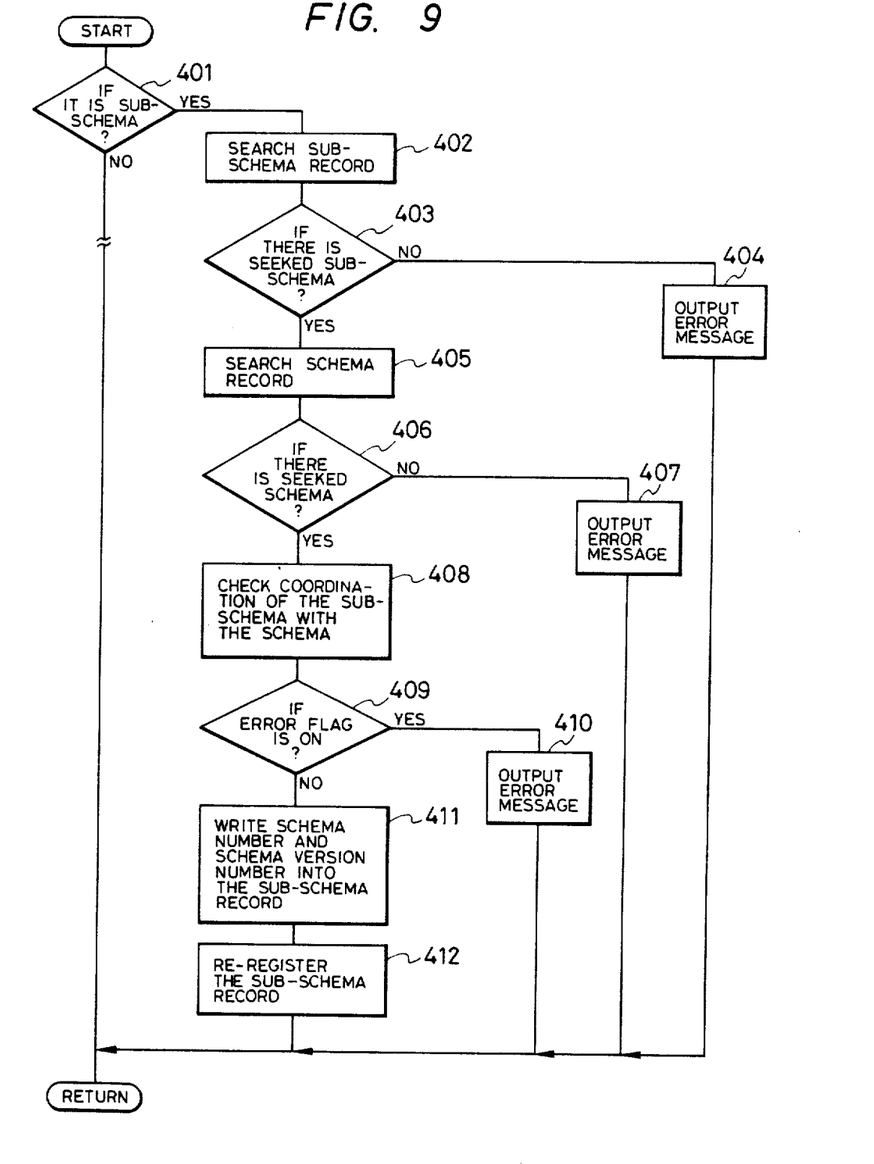
FIG. 9 is a diagram which illustrates in detail the coordination check processing of the case of sub-schema definition.

The contents of the above-mentioned processing will be described in detail with reference to the processing for checking coordination between the definition informations of schema and sub-schema in conjunction with a flow chart of FIG. 9.

In this description, the definition informations of schema and sub-schema in the dictionary are, respectively, registered into the data bases having data structures as shown in FIGS. 4 and 5.

As the coordination check processing routine is started, the sub-schema record 51 of FIG. 5 is retrieved and is stored in the work area C (402) with the definition information name of the management command as a key, provided the objects whose coordinations are to be checked are a sub-schema and a schema.

If it is determined that a pertinent sub-schema record does not exist in the dictionary (403), an error message is produced to complete the processing (404).

If the pertinent sub-schema record is found, the schema record 41 shown in FIG. 4 is retrieved and is stored in the work area D (405) with the schema name in the sub-schema record as a key.

If it is determined that a pertinent schema record does not exist in the dictionary (406), an error message is produced to complete the processing (407).

If there exists the pertinent schema record which has a schema name that is referred to in the sub-schema, it means that the schema and the sub-schema are coordinated with regard to the schema name, the coordination is checked between the difinition informations of the schema and the sub-schema, and an error flag is turned on (408) if there is no coordination. If the error flag in the work area 6 of FIG. 1 is turned on (409), an error message is produced (410) to complete the processing.

If there is no coordination error, the schema number and the schema version number in the schema record are added into the sub-schema record (411), and the sub-schema record in the dictionary is renewed (412).

Figure 14:
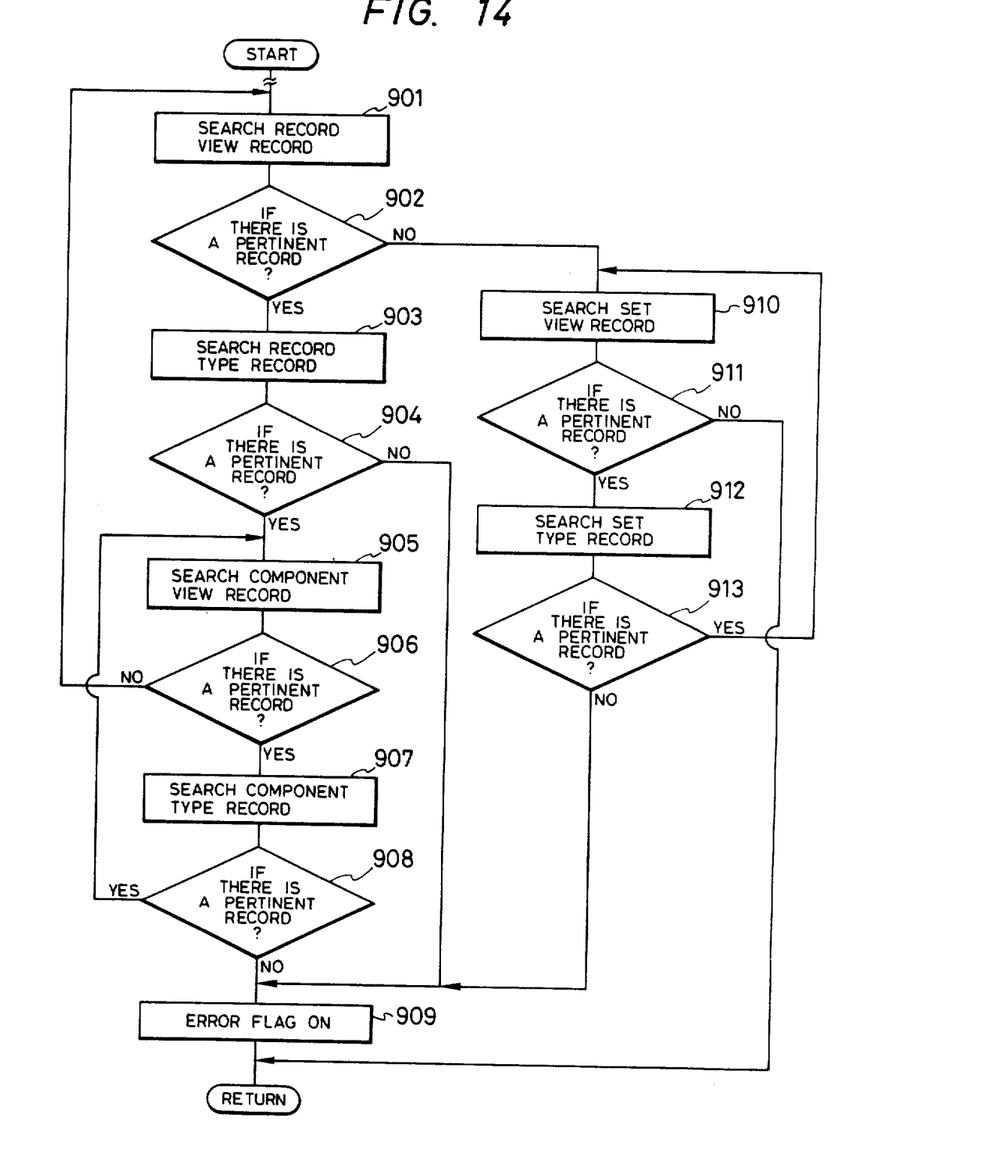
FIG. 14 is a diagram which illustrates in detail the coordination check processing between the sub-schema definition and the schema definition.

The coordination check processing (408) will now be described in detail in conjunction with a flow chart of FIG. 14.

In the coordination check processing, the record view record 52 shown in FIG. 5 is retrieved by one record and is stored in the work area E (901), the record view record 52 having a sub-schema record that has been retrieved already and that is serving as a parent. Whether a pertinent record view record exists or not is determined (902). If it does not exist, the processing subsequent to the step 910 is executed. If the pertinent record view record exists, the record type record 42 shown in FIG. 4 is retrieved by one record and is stored in the work area F (903), the record type record 42 having a record name in the record view record 52 as a key and having a schema record that has been retrieved already as a parent.

Whether there exists a pertinent record type record (record type record that has been referred to in the record view record) is determined (904) in order to examine if there exists in the schema the record type record that is referred to in the sub-schema (904). If the pertinent record type record does not exist, the processing subsequent to the step 909 is effected. If there exists the pertinent record type record, it is confirmed that there exists the coordination with regard to the record. Next, the component view record 53 shown in FIG. 5 in which the record view record retrieved at the step 901 serves as a parent, is retrieved by one record, and is stored in the work area G (905). If there exists a pertinent component view record or not is determined (906). If there does not exist the pertinent component view record, the processing subsequent to the step 901 is repeated for other record view records in which the sub-schema record serves as a parent. If there exists a pertinent component view record (906, yes), the component type record 43 shown in FIG. 4 is retrieved by one record and is stored in the work area H (907), the component type record having a component name in the component view record as a key and having a record type record retrieved in the step 903 as a parent. If there exists a pertinent component type record (which is referred to in the component view record) or not is determined (908). If there does not exist the pertinent component type record, the error flag 6 shown in FIG.

1 is turned on (909) to complete the processing. As a result of retrieval, if there exists the component type record, the coordination is confirmed with respect to the component. Next, the processing subsequent to the step 905 is repeated for other component view records in which the record view record retrieved in the step 901 serves as a parent.

In a step 910, the set view record 54 shown in FIG. 5 in which a pertinent sub-schema record serves as a parent, is retrieved by one record and is stored in the work area 1.

Whether the pertinent set view record exists or not is determined (911). If there does not exist the pertinent set view record, the processing is completed. If there exists the pertinent set view record, the set type record 44 shown in FIG. 4 which has a set name in the set view record as a key and which has a schema record 600t has been retrieved already as a parent, is retrieved and stored in the work area J (912). Whether the pertinent set type record (which is referred to in the set view record) exists or not is determined (913). If it does not exist, the processing subsequent to the step 909 is effected. If there exists the pertinent set type record, the processing subsequent to the step 910 is repeated for other set view records that have the pertinent sub-schema record as a parent. Thus, it is confirmed whether the definition information of schema referred to in the sub-schema is in agreement with the definition information in the schema. When there exists non-coordination, the error flag is turned on.

Figure 10:
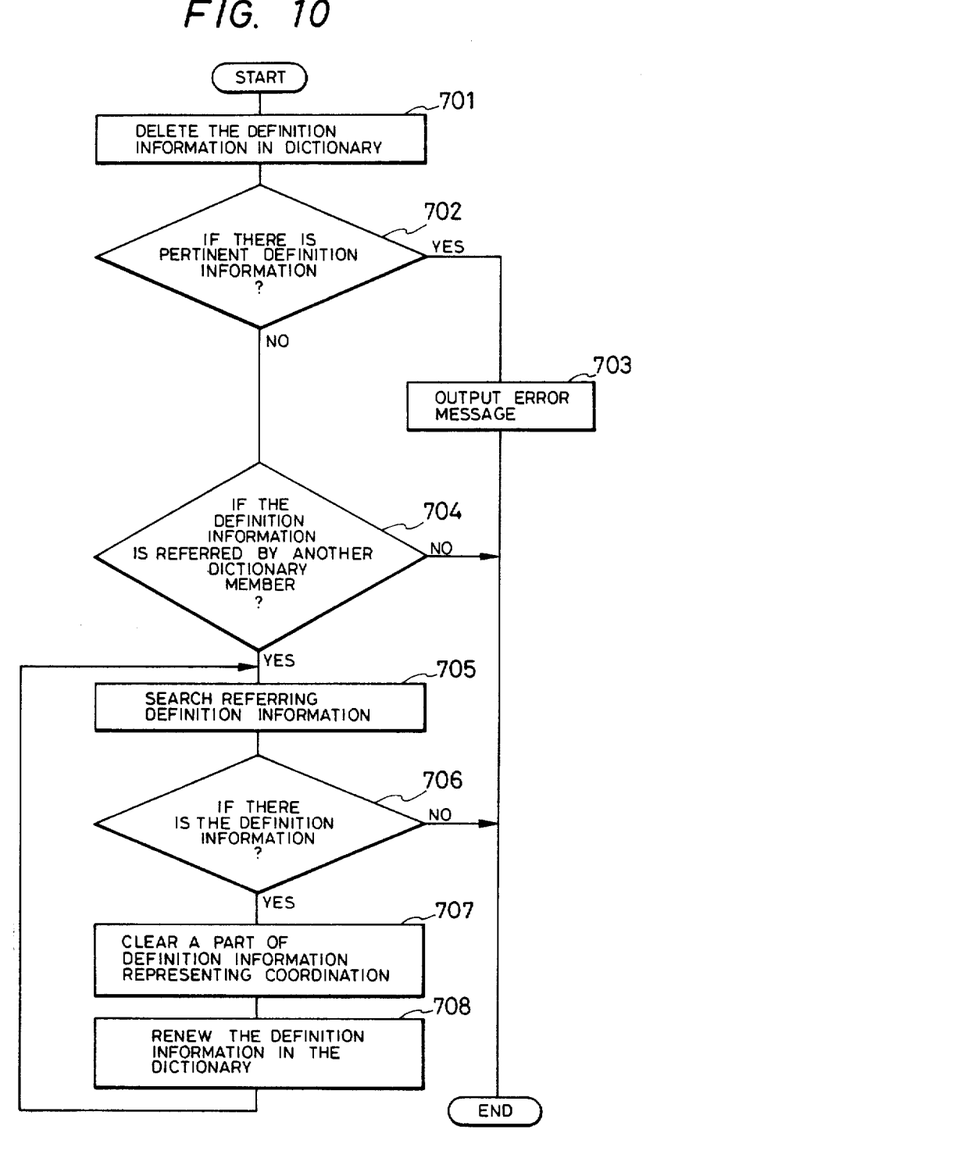
FIG. 10 is a diagram which exemplifies the dictionary deletion processing of FIG. 6.

Outline of the dictionary deletion processing will now be described in conjunction with a flow chart of FIG. 10.

As the dictionary deletion processing routine is started, the definition information in the dictionary is deleted (701), the definition information being specified by a kind of dictionary member in the management command and by the definition information name. If there exists no pertinent definition information (702), an error message is produced (703) to complete the processing.

If the dictionary member (definition unit) to be deleted is not referred to from other definition units (704), the processing is completed. If the dictionary member to be deleted is a definition unit that is referred to, the definition information which is making reference to the deleted definition information in the definition unit that is being referred to, is retrieved with the definition information name in the management command as a key, and is stored in the work area C (705). If there exists no pertinent definition information (706), the processing is completed. If there exists the pertinent definition information, the information (schema number, schema version number, and the like is cleared (707) that is written when the coordination in the definition data is confirmed in the work area C. The dictionary is then renewed (708) using definition information after the above information is cleared.

Figure 11:
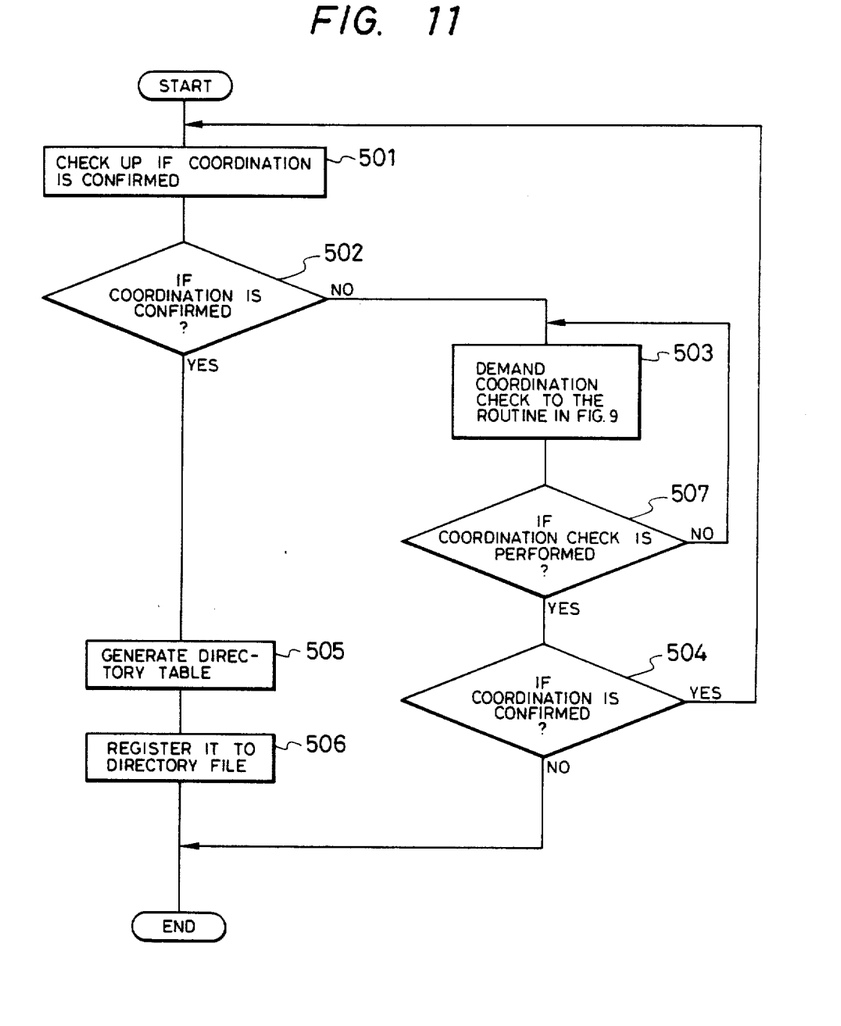
FIG. 11 is a diagram which exemplifies the directory generation processing of FIG. 6.

Outline of the directory generation processing will now be described based upon a flow chart of FIG. 11.

As the directory generation processing routine is started, it is checked whether the coordination has been confirmed among the definition informations that are required for generating the directory (501). If the coordination has not yet been confirmed (502), the coordination check processing is requested (503). If the processing is carried out properly (507, 504), the processing subsequent to the step 501 is repeated. If there exists any abnormal condition, the processing is completed. In this embodiment, the processing is requested to the coordination check processing routines of FIGS. 6 and 9. However, the directory generation processing routine may have a function to check the coordination.

If the coordination has been checked (502), a directory table is generated (505) and is registered into the directory file memory (506).

Figure 12:
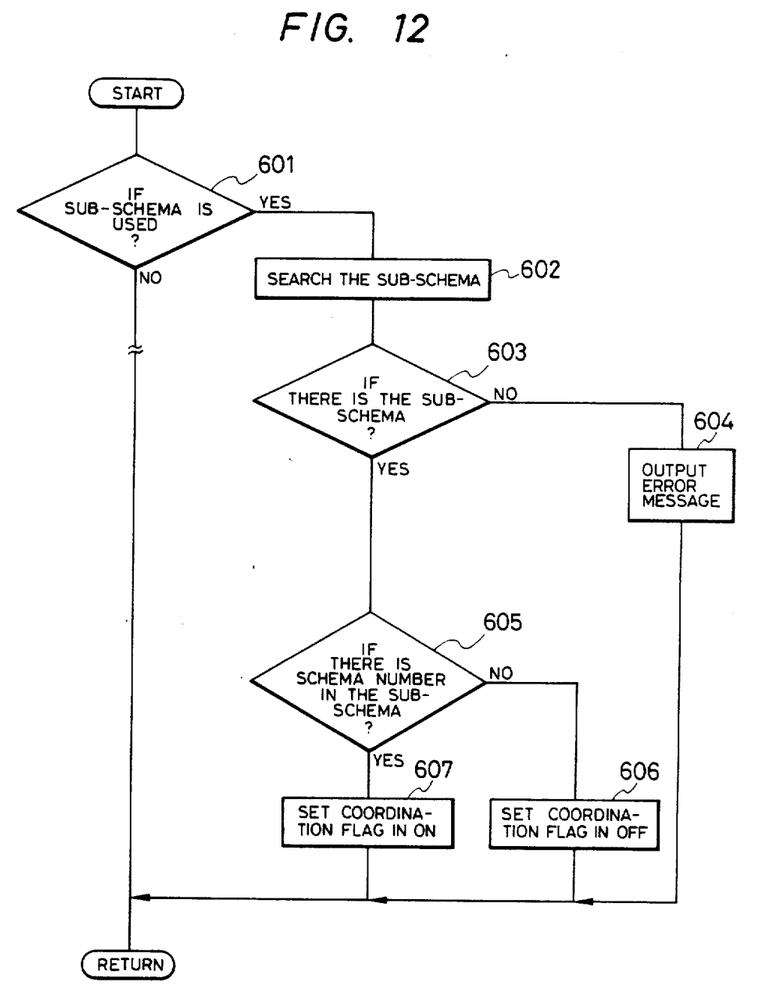
FIG. 12 is a diagram which shows a determination routine for determining whether the coordination is checked or not in the directory generation processing.

Described below is a method of checking whether the coordination is confirmed (501) with reference to generating a directory table relying upon the sub-schema definition information, in conjunction with a flow chart of FIG. 12.

First, if the instruction by the management command is to generate a directory table relying upon the definition information of sub-schema (601), a sub-schema record is retrieved from the dictionary file memory with the definition information name in the management command as a key, and is stored in the work area C (602).

If there exists no pertinent sub-schema record (603), an error message is produced (604) to complete the processing.

If there exists the pertinent sub-schema record (603), it is determined if a schema number is stored in the record (605). If the schema number exists, the coordination check flag shown in FIG. 1 is turned on (607). If the schema number does not exist, the management check flag is turned off (606), and the processing is completed.

Figure 13:
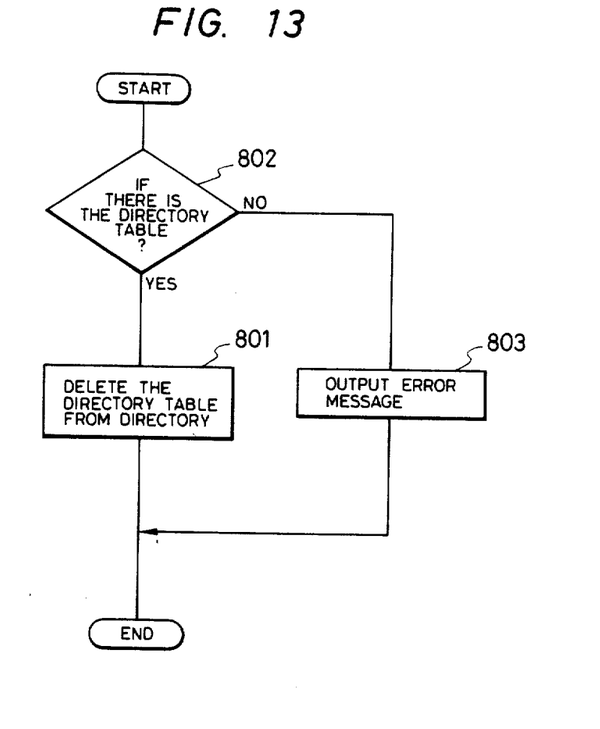
FIG. 13 is a diagram which shows the directory deletion processing of FIG. 6.

Outline of the directory deletion processing will be described with reference to a flow chart of FIG. 13.

As the directory deletion processing routine is started, it is examined if there is a dictionary table that is specified to be deleted by a pertinent command (802). If there is, the directory table in the directory is deleted (801), the directory table being specified by the kind of directory member in the management command and by the definition information name (801). If there is no pertinent directory table (802), an error message is produced (803) to complete the processing.

In registering the definition information of a data base system into a dictionary by dividing it into several definition units according to the present invention, provision is separately made of functions to confirm the coordination among the definition units. Therefore, coordination of the contents of definition can be confirmed when the definition information maintaining coordination is required such as in generating a directory. Therefore, the sequence for registering the definition units up to that moment can be freely selected and registered definition information can be freely renewed, making it possible to improve operability of registration of definition information into the dictionary and control thereof.

What is claimed is:

1. A data base system having a data dictionary system to control access to said data base system, said data dictionary system including a dictionary capable of registering definition informations including definition information and its related definition information, said data base system comprising:

registration means for registering said definition information and its related definition information into said dictionary, to produce registered definition informations, processing means which executes a predetermined program using a definition information registered into said dictionary, and which generates a confirmation request to confirm the coordination between said definition information and its related definition information,; and confirmation means which, in response to said confirmation request, determines the presence or absence of coordination between said registered definition informations, and which, when coordination is confirmed, adds coordination information to the definition information to indicate that the coordination has been confirmed.

2. A data base system according to claim 1, wherein said data dictionary system is part of a dictionary directory system, said dictionary directory system also including a directory formed by using the definition informations registered in said dictionary, wherein said dictionary has schema information which is a definition information and represents the whole structure of the data base, and sub-schema information which is a related definition information for said schema information and represents the structure of the data base of a range that can be used by a user program, said processing means has generation means which generates said directory from said sub-schema information when it is detected that the information which indicates that said coordination has been confirmed is contained in the sub-schema information, and said confirmation means determines the coordination of said sub-schema information and of said schema information, and adds the information which indicates the coordination has been confirmed to said sub-schema information when the coordination is confirmed.

3. A data base system according to claim 2, wherein said confirmation means writes a schema number onto said sub-schema information when the coordination is confirmed, and said processing means generates said directory when it is detected that said schema number is contained in said sub-schema information.

4. A data base system according to claim 2, wherein said confirmation means confirms the coordination that said schema information registered into said sub-schema information is contained in said schema information.

5. In a data base system having a data dictionary system to control access to the data base system, said data dictionary system including a dictionary which registers definition informations, including definition information and its related definition information, to specify the structure of said data base system, and said dictionary further including schema and sub-schema informations, a method for controlling said data base system comprising the steps of:
(a) a step which registers said definition informations into said dictionary;
(b) a step which determines whether it is necessary to confirm the coordination for said definition informations registered in said dictionary according to a confirmation request from a user;
(c) a step which confirms the coordination of said definition informations when it is determined by step (b) that confirmation is requested; and
(d) a step which writes a schema number into said sub-schema information when coordination is confirmed by step (c).

6. A method for managing coordination information for definition informations in a data dictionary system including a dictionary that has a plurality of uniquely identified definition informations, including definition information and its related definition information, said definition informations having coordination information, the method comprising:

a first step for registering said definition informations into said dictionary without confirming coordination between said definition information and its related definition information and adding said coordination information, a second step for generating a confirmation request to confirm coordination between said definition information and its related definition information registered into said dictionary by said first step, when a predetermined program is executed using said definition informations, and a third step for confirming the presence or absence of coordination between said definition information and its related definition information in response to the confirmation request generated from said second step, and adding confirmation information to said definition information, so as to indicate that the coordination has been confirmed.

7. The method for managing coordination information for definition informations, in a data dictionary directory system according to claim 6, wherein, said dictionary comprises schema information which is a definition information which represents the whole structure of the data base and sub-schema information which represents a structure of the data base of a predetermined range and is a related definition information for schema information, said second step further comprises a generation step which generates said dictionary directory from said sub-schema information when it is detected that said coordination information which indicates that the coordination has been confirmed is contained in said sub-schema information, and said third step comprises the steps of determining said coordination between said sub-schema information and said schema information, and adding said coordination information which indicates the coordination has been confirmed to said sub-schema information.

8. The method for managing coordination information for definition informations in a data dictionary directory system according to claim 7, wherein said coordination information comprises a schema number.

9. The method for managing coordination information for definition informations in a data dictionary directory system according to claim 7, wherein said third step comprises the step of confirming said coordination that said schema information registered into said sub-schema information is contained in said sub-schema information.

10. The method of claim 6, wherein said predetermined program of said second step comprises a dictionary deletion program, said program comprising the steps of:
referring said definition informations for deletion according to a request by a user,
confirming coordination information exists, and
thereafter deleting the pertinent definition informations.

11. A data base system of claim 1, further comprising deletion means which, in deleting definition information with the coordination information, first initializes the coordination information registered in the related definition information, and then deletes the definition information.

12. A method for managing coordination information for definition informations in a data dictionary directory system having a dictionary that has a plurality of uniquely identified definition informations, including definition information and its related definition information, said definition informations having coordination information, and said data dictionary directory system also having a directory which is formed by using the definition information registered in said dictionary, comprising:
- a first step for registering said definition informations into said dictionary without confirming coordination between said definition information and its related definition information, and adding said coordination information,
- a second step for generating a confirmation request to confirm coordination between said definition information and its related definition information registered into said dictionary by said first step, when a predetermined program is executed using said definition information and its related definition information, and
- a third step for confirming the presence or absence of coordination between said definition information and its related definition information in response to the confirmation information to said definition information, so as to indicate that the coordination has been confirmed.

13. The method of claim 6, further comprising:
a fourth step for deleting specified definition information, wherein the coordination information registered in the related definition information is first initialized, and thereafter deleting the definition information.

* * * * *